United States Patent
Montenot et al.

(10) Patent No.: US 10,491,561 B2
(45) Date of Patent: Nov. 26, 2019

(54) EQUIPMENT FOR OFFERING DOMAIN-NAME RESOLUTION SERVICES

(71) Applicant: Airbus Defence and Space SAS, Toulouse (FR)

(72) Inventors: Jean-Marc Montenot, Balma (FR); Franck Scholler, Saint Germain en Laye (FR); Frederic Bonfanti, Toul (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 144 days.

(21) Appl. No.: 15/761,290

(22) PCT Filed: Sep. 9, 2016

(86) PCT No.: PCT/EP2016/071259
§ 371 (c)(1),
(2) Date: Mar. 19, 2018

(87) PCT Pub. No.: WO2017/050591
PCT Pub. Date: Mar. 30, 2017

(65) Prior Publication Data
US 2018/0270189 A1    Sep. 20, 2018

(30) Foreign Application Priority Data

Sep. 22, 2015 (FR) ..................... 15 58926

(51) Int. Cl.
*H04L 29/12* (2006.01)
*H04L 29/06* (2006.01)

(52) U.S. Cl.
CPC ...... *H04L 61/1511* (2013.01); *H04L 61/2007* (2013.01); *H04L 63/0272* (2013.01); *H04L 63/0876* (2013.01); *H04L 63/101* (2013.01)

(58) Field of Classification Search
CPC ... G06F 16/9535; G06F 16/9537; H04L 43/14
See application file for complete search history.

(56) References Cited

U.S. PATENT DOCUMENTS 7,299,491 B2 * 11/2007 Shelest ................... H04L 63/08
726/26
9,900,281 B2 * 2/2018 Kaliski, Jr. ........... H04L 61/106
(Continued)

OTHER PUBLICATIONS

Liang Zhu. Connection-Oriented DNS to Improve Privacy and Security. IEEE. 2015 (Year: 2015).*
(Continued)

*Primary Examiner* — Bryan Lee
(74) *Attorney, Agent, or Firm* — Greer, Burns & Crain, Ltd.

(57) ABSTRACT

In order to offer domain name resolution services vis-à-vis resources of various security domains of a communication network, an item of equipment, on reception of a domain name resolution request coming from a client device, performs: authentication operations checking whether the client device that sent the request was previously registered; authorisation operations checking whether the client device actually has right of access to the resources of said domain name; and domain name resolution operations by means of a cache storing associations of IP addresses and domain names. The cache is populated by means of the results of domain name resolutions performed by external name servers to which said equipment resort to via respective secure tunnels, independently of said security domains, when the cache does not include data allowing to effect the domain name resolution required.

20 Claims, 5 Drawing Sheets

(56) References Cited

U.S. PATENT DOCUMENTS

| | | | |
|---|---|---|---|
| 10,270,755 B2* | 4/2019 | McPherson | H04L 61/1511 |
| 2009/0113074 A1* | 4/2009 | Statia | H04L 29/12066 |
| | | | 709/245 |
| 2011/0119306 A1* | 5/2011 | Patil | H04L 29/12066 |
| | | | 707/783 |

OTHER PUBLICATIONS

Zhu et al; "T-DNS: Connection-Oriented DNS to Improve Privacy and Security (extended)," Jun. 30, 2014; 26 pp.; retrieved from http://www.isi.edu/~johnh/PAPERS/Zhu14b.pdf on May 10, 2016.
Nov. 18, 2016 Search Report issued in International Patent Application No. PCT/EP2016/071259.

* cited by examiner

EQUIPMENT FOR OFFERING DOMAIN-NAME RESOLUTION SERVICES

The present invention relates to the resolution of domain names and the identification of IP (Internet protocol, as defined in the standard document RFC 791) addresses associated with domain names, while ensuring that restrictions on access to said domain names and to said IP addresses are complied with.

In the context of secure IP-service architectures, isolation of various transport, filtering, routing, resolution, etc layers is at the present time necessary for guaranteeing impermeability between said services when they rely on the same physical communication network infrastructure. Implementing virtual private networks (VPNs) through mechanisms of the VRF (virtual routing and forwarding) type and firewall (FW) devices allows to ensure such impermeability. This approach allows to reduce the hardware costs, but all the same, from a logic point of view, leads to distinct disconnected infrastructures. Upgradability and the operating and maintenance (OaM) costs are affected accordingly. Furthermore, some service layers, in particular the resolution of domain names, cannot benefit from the virtualisation mentioned. This is because domain name resolution servers, e.g. of the DNS (domain name system) type, are not suitable for supporting virtualisation, in particular software virtualisation, and also they do not allow to apply distinctive security rules at the user and accessible-resource level. In other words, current domain name resolution technology does not allow to distinguish the users of a domain name resolution service instance or to choose the resources that are exposed and accessible to it, unless there is deployment of as many domain name resolution servers as there are distinct secure infrastructures.

It is desirable to overcome these various drawbacks of the prior art. It is thus desirable to provide a group of users with the possibility of resorting to, in a simple and flexible manner, to domain name resolution services, and optionally reverse resolution services, while complying with distinct security constraints according to the users in accordance with security domains in which said users respectively are entitled to act. It is also desirable to allow to enable one or more users to act easily in a plurality of security domains. It is also desirable to allow to enable one or more users to access only a subpart of the resources of one or more security domains. It is also desirable to provide a solution that aims to reduce the latency of processing domain name resolution requests, and optionally of processing reverse resolution requests. It is in particular desirable to provide a solution that is simple to implement and at low cost.

The invention relates to equipment suitable for offering domain name resolution services, said equipment being intended to be connected to a communication network implementing security domains, said equipment being intended to be declared as a domain name server with client devices in said communication network. Said equipment includes: a client interface unit suitable for receiving domain name resolution requests coming from said client devices and for responding to said requests, each domain name resolution request including an IP address of the client device that sent said request and a domain name to be resolved; an authentication unit suitable for performing first authentication operations checking, for each domain name resolution request, at least by means of the IP address of the client device that sent said request, whether said client device that sent said request or a user of said client device has previously been registered with said equipment or an external authentication server to which said equipment is connected; an authorisation unit suitable for performing first authorisation operations checking, for each request for resolution of a domain name authenticated by the authentication unit, whether the client device that sent said request or the user of said client device actually has a right of access to the resources of said domain name; a domain name resolution unit suitable for performing domain name resolution operations by means of a cache in which said equipment stores associations of IP addresses and respective domain names, said cache being populated by means of results of domain name resolutions made by external name servers each corresponding to one of said security domains to which said equipment is intended to be connected via respective secure tunnels and to which said equipment resort to, independently of said security domains, when said cache does not include data allowing to effect the required domain name resolution. Thus, although the client devices or the users of said client devices must be confined to distinct respective security domains, the domain name resolution services may be implemented on a common platform guaranteeing impermeability between said security domains. Through the management of such impermeability by virtue of the authentication and authorisation operations, this common platform is easily upgradable. Adding new security domains is thus easily done by using the authorisation data for the client devices or users concerned. In addition, although the exchanges with the external name servers are made via secure tunnels allowing to ensure impermeability between the security domains to which said external name servers belong, said equipment uses said external name servers independently of said security domains, which reinforces the simplicity of use of said equipment when new security domains are to be added.

According to a particular embodiment, the client interface unit triggers the domain name resolution operations in parallel with said first authentication and authorisation operations. Thus the latency of processing the domain name resolution requests by said equipment is reduced.

According to a particular embodiment, the client interface unit effects a filtering of the domain name resolution requests received by checking that each request actually contains, in useful data, domain name information formatted as expected by said equipment. Thus malicious tunnelling attempts can easily be prevented and attacks of the denial of service or distributed denial of service can easily be warded off.

According to a particular embodiment, the client interface unit effects another filtering on the basis of a history of use of the services of said equipment by the client devices that respectively sent said domain name resolution requests. Thus the detection of malicious behaviour and reaction to such behaviours are improved.

According to a particular embodiment, the authentication unit is also suitable for obtaining, in each request processed by said authentication unit, information on identification of a user where the use of the client device that sent said request has given rise to the sending of said request, and said first authentication operations also check that said identification information corresponds to a user previously registered with said equipment or with the external authentication server in association with the IP address of said client device. Thus authentication is reinforced.

According to a particular embodiment, the authorisation unit has locally a data repository in which the authorisation unit, for each request for resolution of a domain name authenticated by the authentication unit, checks whether the client device that sent said request or the user of said client device actually has right of access to the resources of said domain name, said data repository being populated by means of the results of authorisations made by an external authorisation server to which said equipment is connected and to which said equipment resort to when said data repository does not include data allowing to make the required authorisation. Thus the latency of processing of the domain name resolution requests by said equipment is further reduced.

According to a particular embodiment, said data repository defines, for each user or client device previously recorded, which are the domain names the resources of which are accessible to said user or to said client device. Thus the latency of processing of the domain name resolution requests by said equipment is further reduced, by virtue of the fact that the structure of said repository allows to make searches (and consequently updates) by user identifier or client device.

According to a particular embodiment, the authentication unit locally has a data repository containing authentication data of client devices previously recorded and in which the authentication unit, for each request for resolution of a domain name, checks whether the client device that sent said request or a user whose use of said client device has given rise to the sending of said request has actually been previously registered, said data repository being populated by means of results of authentications made by the external authentication server and to which said equipment resort to when said data repository does not include data allowing to make the required authentication. Thus the latency of processing of the domain name resolution requests by said equipment is further reduced.

According to a particular embodiment, the domain name resolution unit is, when the domain name resolution unit uses the external name servers, suitable for requesting in parallel the domain name resolution of said external name services, and the first valid positive response received is used to populate said cache. Thus the latency of processing of the domain name resolution requests by said equipment is further reduced, and the implementation of said equipment vis-à-vis exchanges with said name servers is simple and flexible vis-à-vis the various security domains in the context of domain name resolution operations.

According to a particular embodiment, said equipment is, following said first authentication operations, suitable for declaring the client device that sent the domain name resolution requests in said cache by entering therein the IP address of said client device in association with another representation of said IP address in a form that can be assimilated to a domain name. Said equipment is further suitable for offering reverse resolution services, and to do this: the client interface unit is suitable for receiving reverse resolution requests coming from said client devices and for responding to said requests, each reverse resolution request including an IP address of the client device that sent said request and an IP address to be identified; the authentication unit is suitable for performing second authentication operations checking, for each reverse resolution request, at least by means of the IP address of the client device that sent said request, whether said client device or a user of said client device has previously been registered with said equipment or said external authentication server; the authorisation unit is suitable for performing second authorisation operations checking, for each reverse resolution request authenticated by the authentication unit, whether the client device that sent said request or the user of said client device actually has right of access to the resources to which said reverse resolution relates; and the domain name resolution unit is suitable for performing reverse resolution operations by means of the cache, by checking whether the IP address to be identified is contained in said cache and having resort to the external name servers, independently of said security domains, when said cache does not include data allowing to effect the required reverse resolution. Thus, although the client devices or the users or said client devices must be confined to distinct respective security domains, the reverse resolution services may also be implemented on a common platform guaranteeing impermeability between said security domains.

According to a particular embodiment, the client interface unit triggers the reverse resolution operations in parallel with said second authentication and authorisation operations. Thus the latency of processing of the reverse resolution requests by said equipment is reduced.

According to a particular embodiment, the domain name resolution unit is, when the domain name resolution unit has resort to the external name servers, suitable for requesting in parallel the reverse resolution of said external name servers, and the first valid positive response received is used to populate said cache. Thus the latency of processing of the reverse resolution requests by said equipment is further reduced, and the implementation of said equipment vis-à-vis exchanges with said name servers is simple and flexible vis-à-vis the various security alert domains in the context of the reverse resolution operations.

According to a particular embodiment, said equipment is, when said equipment detects the presence of a malicious client device, suitable for providing a fictitious IP address to the malicious client device, in response to a domain name resolution request sent by said malicious client device. This allows to observe the means of compromising a client device suspected of being malicious and allowing more time to act against said malicious client device, without exposing sensitive network resources to which the malicious client device wishes to have access.

According to a particular embodiment, said equipment is, when said equipment detects the presence of a malicious client device, suitable for transmitting to an SDN controller information indicating that the presence of a malicious client device has been detected, said information including the IP address of said malicious client device, so that the SDN controller isolates said malicious client device. Thus the malicious client device can no longer act on said equipment.

According to an alternative particular embodiment, said equipment is, when a client device is authenticated and authorised to receive the result of a domain name resolution following the authentication and authorisation operations, suitable for transmitting to an SDN controller information indicating that said client device has obtained authorisation to receive the result of the domain name resolution and that a virtual IP address is required in replacement for the IP address that actually corresponds to said domain name, so that the SDN controller allocates said virtual IP address and effects an address translation parameterising with boundary routers of the communication network managed by the SDN controller so that said virtual IP address is associated with the IP address that actually corresponds to said domain name. In addition, said equipment is suitable for supplying said virtual IP address to said client device in place of the IP address that actually corresponds to said domain name. By using virtual IP addresses, it is easy to invalidate access to sensitive resources for a client device that proves to be malicious, since said client device has not had knowledge of the real IP address of the domain name in question.

According to a particular embodiment, said equipment is suitable for supplying distinct virtual IP addresses to distinct client devices for the same domain name. Thus it is possible to invalidate access to sensitive resources for a client device that proves to be malicious, without having to effect reconfiguration vis-à-vis other client devices that effected domain name resolutions for this same domain name.

According to a particular embodiment, said equipment comprises a supplementary cache, and said equipment is suitable for storing said virtual IP address in the supplementary cache in association with the real IP address associated with said domain name, in correspondence with the IP address of the client device that sent the domain name resolution request that gave rise to the allocation of said virtual IP address, in order to respond to a future reverse resolution request vis-à-vis said virtual IP address by acting on the supplementary cache in order to obtain the real IP address corresponding to said virtual IP address, while checking that it is this virtual IP address that had been communicated to the client device that sent said future reverse resolution request. Thus it is possible to effect a reverse resolution on a virtual IP address without having to recontact the SDN controller.

According to a particular embodiment, said information transmitted by said equipment to the SDN controller also includes a time period, so that the SDN controller performs operations, with boundary routers of the communication network, of cancelling the address translation parameterising when said time period has expired, and said equipment is suitable for deleting from the supplementary cache the data relating to said virtual IP address when said time period has expired. Thus, beyond this time period, the client device in question must renew its domain name resolution request in order to continue to have access to the resources of the domain name in question, and its access to the resources of the domain name in question can thus easily be called into question.

The invention also relates to a method implemented by equipment for offering domain name resolution services, said equipment being connected to a communication network implementing security domains, said equipment being declared to be a domain name server with client devices in the communication network. Said equipment performs the following steps: receiving domain name resolution requests coming from said client devices and responding to said requests, each domain name resolution request including an IP address of the client device that sent said request and a domain name to be resolved; performing authentication operations checking, for each domain name resolution request, at least by means of the IP address of the client device that sent said request, whether said client device or a user of said client device has previously been registered with said equipment or an external authentication server to which said equipment is connected; performing authorisation operations checking, for each request for resolution of a domain name authenticated by the authentication unit, whether the client device that sent said request or the user of said client device actually has a right of access to the resources of said domain name; performing domain name resolution operations by means of a cache in which said equipment stores associations of IP addresses and respective domain names, said cache being populated by virtue of results of domain name resolutions performed by external name servers each corresponding to one of said security domains to which said equipment is connected via respective secure tunnels and to which said equipment has resort to, independently of said security domains, when said cache does not include data allowing to effect the required domain name resolution.

The invention also relates to a computer program that can be stored on a medium and/or downloaded from a communication network in order to be read by a processor. This computer program comprises instructions for implementing the method mentioned above, when said program is executed by said processor. The invention also relates to storage means on which such a computer program is stored.

The features of the invention mentioned above, as well as others, will emerge more clearly from a reading of the following description of an example embodiment, said description being given in relation to the accompanying drawings, among which:

Figure 1:
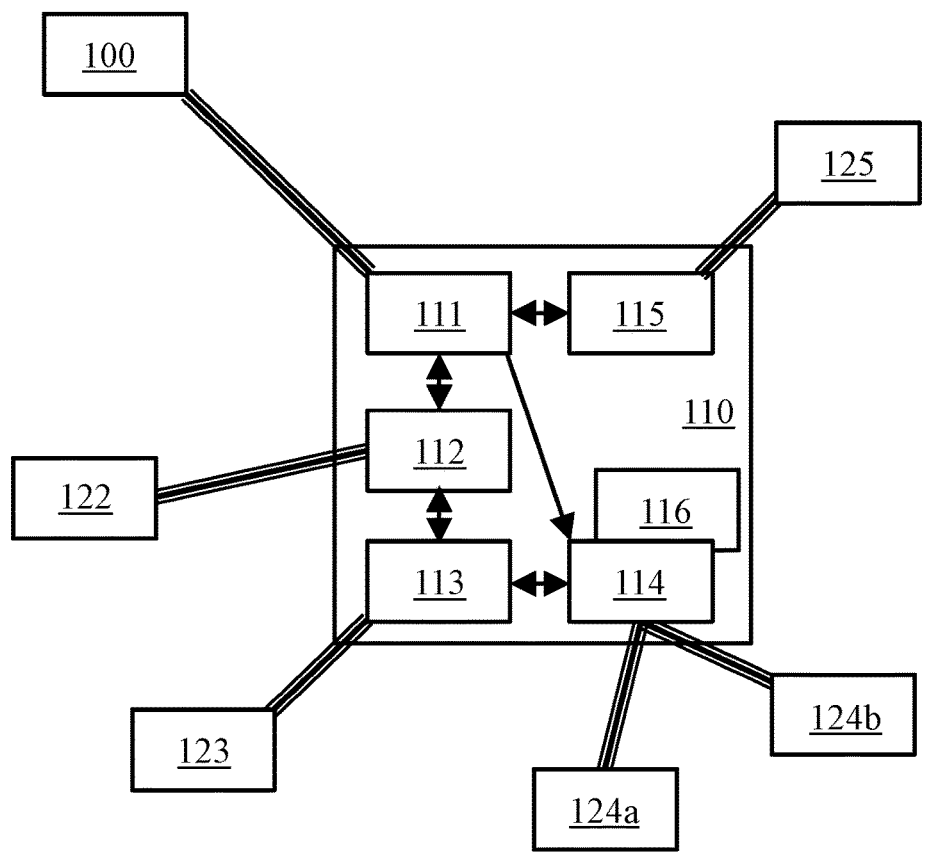
FIG. 1 illustrates schematically a communication system implementing the present invention.

FIG. 1 illustrates schematically a communication system implementing the present invention. The communication system in FIG. 1 comprises equipment 110 suitable for offering domain name resolution services, and preferably reverse resolution services, via a communication network implementing various security domains. The equipment 110 is thus suitable for supplying, in response to a domain name resolution request, an IP address corresponding to a domain name included in said request. The equipment 110 can also be adapted to supply, in response to a request for identification of an IP address included in said request (i.e. a reverse resolution request), an associated domain name or, in the case where said IP address corresponds to a client device, an identifier of said client device by means of which said client device was previously registered in the communication system or an identifier of a user of said client device, by means of which said user was previously registered in the communication system.

The equipment 110 is suitable for receiving requests, for example requests of the DNS type, from client devices (such as the client device 100 in FIG. 1), to effect domain name resolutions. The equipment 110 is suitable for receiving requests, for example requests of the DNS type, from client devices 100, for effecting reverse resolutions. To do this, each client device liable to use the services offered by the equipment 110 is previously configured so that the IP address of the equipment 110 is indicated as the server IP address to be contacted for domain name resolutions and reverse resolutions. Thus, in the DNS context, the equipment 110 is declared to be a DNS server to said client devices.

Exchanges between the equipment 110 and each client device 100 are preferentially made via a secure tunnel, but may also be made in clear. These secure tunnels are not used for implementing the various security domains, but for simply protecting exchanges between the client devices independently of each security domain in which the client device concerned actually has the right to act, and simplifying the filtering of the traffic in the communication system. This is because, as detailed below, the impermeability of the security domains is ensured by means of authorisation operations.

In a preferred embodiment, the equipment 110 comprises a client interface unit 111, also referred to as a front-end unit. The client interface unit 110 is responsible for receiving the requests coming from the client devices and providing any responses to said request. As detailed hereinafter, the client interface unit 111 may also be responsible for effecting a filtering for checking that the request received is correctly formatted, in order in particular to ward off any attempt of malicious tunnelling, e.g. DNS tunnelling, or an attack of the denial of service DoS or distributed denial of service DDoS type. The client interface unit 111 is responsible for triggering operations of authentication of the client devices that respectively sent the request received, and preferentially anticipating domain name resolution operations and preferentially anticipating reverse resolution operations. The client interface unit 111 may thus be responsible for triggering operations of updating a file or a database or log.

The equipment 110 is therefore suitable for performing said operations of authentication of the client devices that respectively sent the requests received. The equipment 110 can, to do this, resort to an external authentication server 122. The exchanges between the equipment 110 and the external authentication server 122 are preferably made via a secure tunnel, but may also be made in clear. This secure tunnel is used to simply protect the exchanges between the equipment 110 and the external authentication server 122, independently of the security domains of the communication system, and to simplify the filtering of the traffic in the communication system. These exchanges are for example in accordance with the RADIUS (Remote Authentication Dial-In User Service) protocol (as defined in the standard documents RFC 2865 and RFC 2866), or the Diameter protocol (as defined in the standard document RFC 3588), or the TACACS+ protocol (Terminal Access Controller Access-Control System Plus), or the LDAP protocol (Lightweight Directory Access Protocol), as defined in the standard documents RFC 1777 and RFC 2251). Other protocols may be used, preferentially based on an architecture of the AAA type (Authentication, Authorisation, Accounting).

In the preferred embodiment, the equipment 110 also comprises an authentication unit 112 responsible for performing said authentication operations. The authentication unit 112, in this context, resort locally to a data repository of the CIDR (Classless Inter-Domain Routing) type and/or to the external authentication server 122. The authentication unit 112 is also responsible for triggering authorisation operations vis-à-vis client devices that respectively sent the requests received.

The CIDR data repository implemented locally by the equipment 110 is preferentially updated by means of information received coming from the external authentication server 122, when said CIDR data repository implemented locally by the equipment 110 does not contain the authentication data relating to the client device, or to the user, on behalf of which a domain name resolution is requested. This aspect is detailed hereinafter in relation to FIG. 3. In addition, in the context of reverse resolutions, the CIDR data repository implemented locally by the equipment 110 is preferentially updated by means of information received coming from the external authentication server 122, when said CIDR data repository implemented locally by the equipment 110 does not contain the authentication data relating to the client device, or to the user, on behalf of which a reverse resolution is requested. This aspect is detailed below in relation to FIG. 4.

This CIDR data repository may be implemented in the equipment 110 in the form of a file or in the form of a memory database instance. In a preferred embodiment as described below in relation to FIG. 3, this CIDR data repository is updated by means of the external authentication server 122. The authentication data are then preferentially stored therein temporarily, that is to say said authentication data are valid therein only until the next reinitialisation of the equipment 110 and are limited therein to the results of the last authentication operations, the number of such operations and the size of this data repository being configurable.

The equipment 110 is therefore suitable for performing said authorisation operations vis-à-vis client devices that have respectively sent the requests received. The authentication operations aim to ensure that the client device 100, or the user of said client device 100, accesses only the resources to which said client device 100 or said user actually has a right of access. These authorisation operations thus serve to check, for each request for resolution of a domain name authenticated by the authentication unit, whether the client device that sent said request, or the user of said client device, actually has right of access to the resources of said domain name. This allows in particular to specify that the same client device can access respective domain name resources in one or more security domains and, for the same security domain, that said client device can access all or some of the respective domain name resources in said security domain. The equipment 110 can, to do this, have resort locally to an ACL (access control list) or CUL (capability user list) data repository and/or to an external authorisation server 123, as described below in relation to FIG. 3. The exchanges between the equipment 110 and the external authorisation server 123 are preferably made via a secure tunnel, but may also be made in clear. This secure tunnel is used for simply protecting the exchanges between the equipment 110 and the external authorisation server 123, independently of the security domains of the communication system, and simplifying the filtering of the traffic in the communication system. These exchanges are for example in accordance with the RADIUS protocol, or the Diameter protocol, or the TACACS+ protocol. Other protocols may be used, preferentially based on an architecture of the AAA type.

The ACL type data repository defines, for each domain name managed by the equipment 110, a set of users or client devices that are authorised to access the resources of the domain name. From the domain name, it is then possible to obtain the list of users or client devices authorised to access the resources of said domain name, and then to check whether this or that user or client device is authorised therefor. It is also possible to define, for each domain name managed by the equipment 110, a set of users or client devices that are not authorised to access the resources of the domain name. It should be noted that the access rights may be indicated in the ACL type data repository in the form of rules. For example, the ACL type data repository may define a set of users or client devices that are authorised to access the resources of all the domain names that end by airbus-.com.

In addition, to allow to effect reverse resolutions, the ACL type data repository defines, for each registration of the PTR pointer (PoinTer Record) corresponding to an IP address for which at least one client device is liable to legitimately request a reverse resolution, a set of users or client devices that are actually authorised to request a reverse resolution on the basis of said IP address. It is also possible to define, for each registration of the PTR pointer managed by the equipment 110, a set of users or client devices that are not authorised to request a reverse resolution on the basis of said IP address. It should be noted that the right to request a reverse resolution may also be indicated in the ACL type data repository in the form of rules. For example, the ACL type data repository may define a set of users or client devices that are authorised to request a reverse resolution for any IP address where the registration of the PTR pointer is formatted as follows: "*.*.168.192.in-addr.arpa", where "*" indicates that the corresponding digits are not taken into account.

The CUL type data repository defines, for each user or client device previously registered, which are the domain names the resources of which are accessible to said user or to said client device. Such a data repository allows to orient searches to the users or client devices, unlike the ACL type data repository, which allows to orientate the searches to the domain names. From an identifier of a client device (such as for example its IP address, its MAC address or its domain name) or an identifier or a user of said client device, it is then possible to obtain the list of domain names to the resources of which said user or said client device is authorised to have access, and then to check whether said client device or said user is authorised to access the resources of this or that domain name. It is also possible to define, for each client device or each user previously registered with the equipment 110, a set of domain names to the resources of which said client device or said user is not authorised to have access.

In addition, to allow to effect reverse resolutions, the CUL type data repository defines, for each user or client device previously registered with the equipment 110, which are the registrations of the PTR pointer corresponding respectively to IP addresses for which said client device or said user is entitled to request any reverse resolution. It is also possible to define, for each user or client device previously registered with the equipment 110, which are the PTR pointer registrations corresponding respectively to IP addresses for which said client device or said user is not entitled to request a reverse resolution. It should be noted that, as with the ACL type data repository, the right to request a reverse resolution may also be indicated in the CUL type data repository in the form of rules.

The CUL type data repository is thus preferentially implemented in the case where there are supposed to exist more potentially accessible domain names than there are client devices or users, and the ACL type data repository is thus preferentially implemented in the contrary case. Because of the structure of said data repositories, the performances of the authorisation operations are enhanced thereby.

The CUL or ACL type data repository implemented locally by the equipment 110 is preferentially updated by means of information received coming from the external authorisation server 123, when said CUL or ACL type data repository implemented locally by the equipment 110 does not contain the authorisation data relating to the client device, or to the user, on behalf of which a domain name resolution is requested. This aspect is detailed below in relation to FIG. 3. In addition, in the context of reverse resolutions, the CUL or ACL type data repository implemented locally by the equipment 110 is preferentially updated by means of information received coming from the external authorisation server 123, when said CUL or ACL type data repository implemented locally by the equipment 110 does not contain the authorisation data relating to the client device, or to the user, on behalf of which a reverse resolution is requested. This aspect is detailed below in relation to FIG. 4.

The ACL or CUL type data repository may be implemented locally in the equipment 110 in the form of a file or in the form of a memory database instance. When the ACL or CUL type data repository is updated by means of the external authorisation server 123, the authorisation data are then preferentially stored therein temporarily, that is to say said authorisation data are valid therein only until the next reinitialisation of the equipment 110 and are limited therein to the results of the last authorisation operations, the number of these operations and the size of this data repository being configurable.

In the preferred embodiment, the equipment 110 also comprises an authorisation unit 113 responsible for performing said authorisation operations. The authorisation unit 113, in this context, resort locally to the ACL or CUL type data repository and/or to the external authorisation server 123. The authorisation unit 113 is also responsible for triggering domain name resolution operations, and preferentially reverse resolution operations, as requested by the requests received.

The equipment 110 is therefore suitable for performing said domain name resolution operations and preferentially said reverse resolution operations, as requested by the requests received. The equipment 110 may, to do this, resort to one or more external name servers 124a, 124b. The external name servers 124a, 124b are preferentially DNS servers. The exchanges between the equipment 110 and each external name server 124a, 124b are therefore preferentially in accordance with the DNS protocol. One of the aforementioned security domains corresponds to each external name server 124a, 124b. There may be a plurality of external name servers per security domain. The exchanges between the equipment 110 and each external name server 124a, 124b are then made via a secure tunnel thus ensuring impermeability between the various security domains at the external name servers 124a, 124b.

In the preferred embodiment, the equipment 110 also comprises a domain name resolution unit 114 responsible for performing said domain name resolution operations and preferentially the reverse resolution operations. The domain name resolution unit 114 comprises a cache 116 used for storing, at least temporarily, associations between domain names and corresponding IP addresses, obtained by means of information transmitted by the external name servers 124a, 124b. In addition, in the context of reverse resolutions, the equipment 110 stores, in the cache 116, associations between IP addresses of client devices that sought the domain name resolution services offered by the equipment 110 and another representation of said IP address in a form assimilatable to a domain name, as described below in relation to FIGS. 3 and 4.

Said associations are preferentially stored in the cache 116 for a predefined limited period, beyond which the domain name resolution unit 114 considers that said data are out of date and must be deleted from the cache 116.

The equipment 110 is preferentially suitable for performing operations of updating a file, or a database or journal allowing to construct and update a history of use of the services offered by the equipment 110. This file, database or journal may be implemented locally in the equipment 110. This file or database or journal may be implemented in an external traceability server 125. The exchanges between the equipment 110 and the external traceability server 125 are made via a secure tunnel. These exchanges are for example in accordance with the RADIUS protocol or the Diameter protocol or the TACACS+ protocol. Other protocols may be used, preferentially based on an architecture of the AAA type.

In the preferred embodiment, the equipment 110 also comprises a traceability unit 115 responsible for performing said operations of updating the file or database or journal. The traceability unit 115 is also responsible for extracting information from the file or database or journal, at the request of the client interface unit 111.

Figure 3:
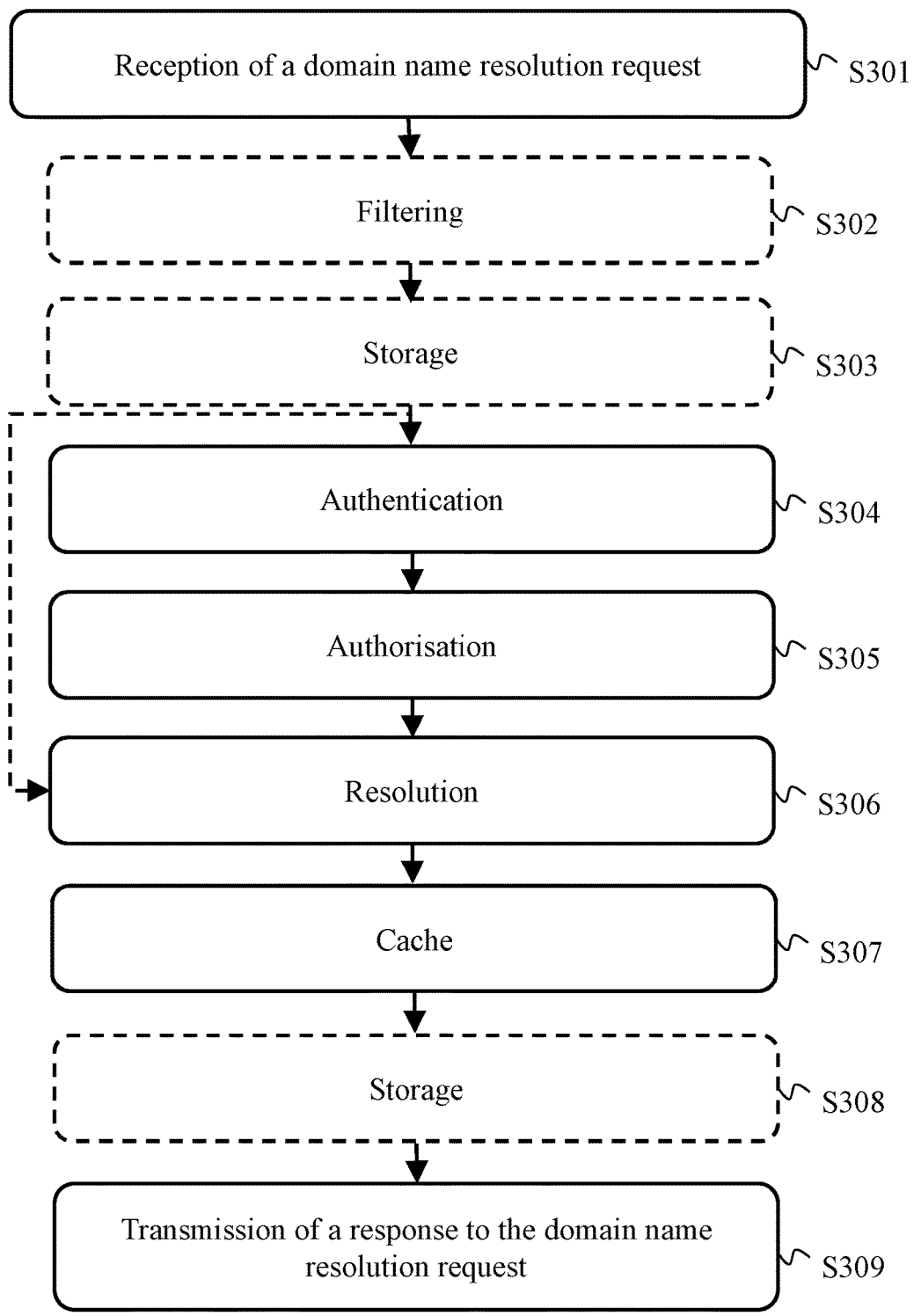
FIG. 3 illustrates schematically an algorithm used by said equipment for effecting a domain name resolution.
Figure 4:
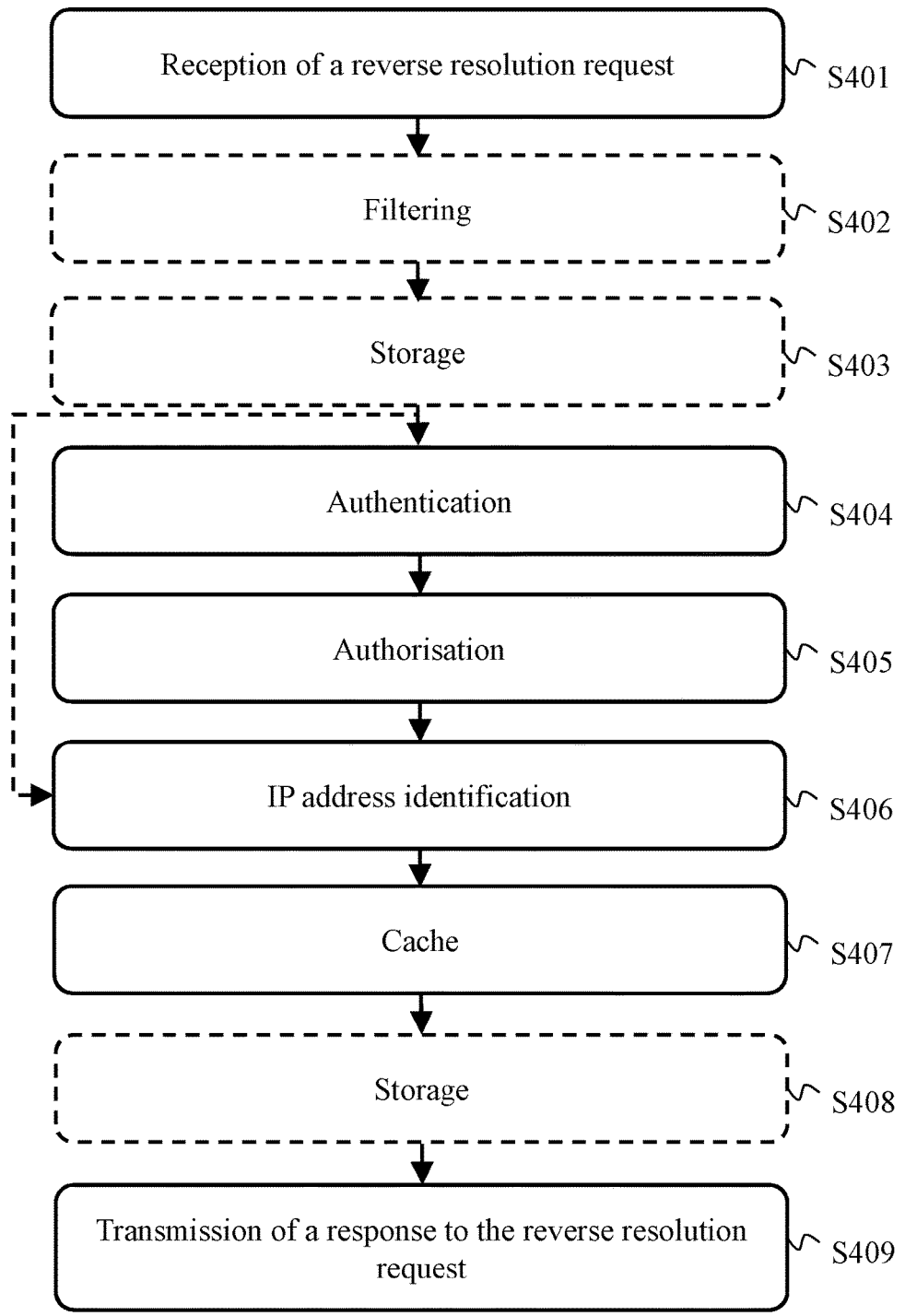
FIG. 4 illustrates schematically an algorithm used by said equipment for effecting an IP address identification, i.e. a reverse resolution.

These various aspects are detailed hereinafter in relation to FIGS. 3 and 4 illustrating behaviours of the equipment 110 on reception, respectively, of requests requesting the effecting of domain name resolutions and requests requesting the effecting of reverse resolutions.

The equipment 110 may also be implemented in the form of a single machine or a set of a plurality of machines cooperating so as to implement the units mentioned above and/or the behaviours detailed hereinafter in relation to FIGS. 3 and 4.

The structure of the equipment 110 and its behaviour as described below allow to ensure that each client device, and thus each user, can access only the resources of the domain names restricted to the security domain or domains to which said client device and said user have a right of access. The structure of the equipment 110, and its behaviour as described below, thus allow to guarantee the security of the accesses to said resources, while being based on the mutualised platform.

Figure 2:
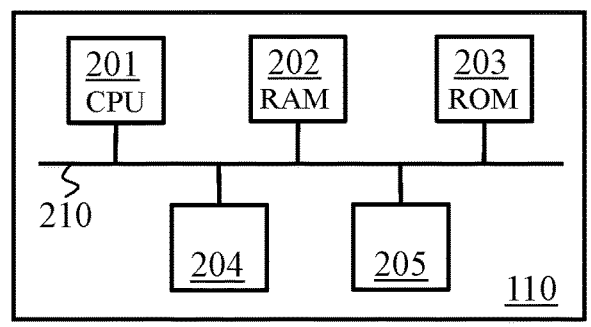
FIG. 2 illustrates schematically an example of hardware architecture of equipment of the communication system of FIG. 1.

FIG. 2 illustrates schematically an example of hardware architecture of the equipment 110.

The equipment 110 then includes, connected by a communication bus 210: a processor or CPU (central processing unit) 201; a random access memory (RAM) 202; a read only memory (ROM) 203; a storage unit 204 or a storage medium reader, such as an SD (secure digital) card reader or a hard disk drive (HDD); and at least one interface 205 enabling the equipment 110 to communicate within at least one communication network.

The processor 201 is capable of executing instructions loaded into the RAM 202 from the ROM 203, or from an external memory, or from a storage medium, or from a communication network. When the equipment 110 is powered up, the processor 201 is capable of reading instructions from the RAM 202 and executing them. These instructions form a computer program causing the implementation, by the processor 201, of all or some of the algorithms and steps described below in relation to the equipment 110. A similar approach is applicable to all or some of the algorithms and steps described below in relation to an SDN controller 500.

All or some of the algorithms and steps described below in relation to FIGS. 3 and 4 can thus be implemented in software form by the execution of a set of instructions by a programmable machine such as a DSP (digital signal processor) or a microcontroller, or be implemented in hardware form by a machine or a dedicated component, such as an FPGA (field-programmable gate array) or an ASIC (application-specific integrated circuit). A similar approach is applicable to all or some of the algorithms and steps described below in relation to the SDN controller 500.

FIG. 3 illustrates schematically an algorithm, executed by the equipment 110, for effecting a resolution of a domain name, that is to say finding the IP address with which said domain name is associated.

In a step S301, the equipment 110 receives a domain name resolution request. Said request includes domain name information that the client device 100 wishes to resolve. Said request is preferentially in accordance with the DNS protocol, and the domain name information is then for example in the form www.airbus.com. According to the modular architecture presented in relation to FIG. 1, step S301 is performed by the client interface unit 111.

Said request may also include information relating to the identity of a user, whose use of the client device 100 caused the sending of the request received at step S301. Such information relating to the identity of the user is, according to a first example, a user identifier userID and a password. Such information relating to the identity of the user is, according to a second example, a checksum supposed to be obtained by predefined application of a hash function, e.g. of the MD5 (Message Digest 5) type, on one or more items of user identification information. Such information relating to the identity of the user is, according to a third example, a token dynamically modified and shared with the system responsible for the authentication of said user (such as the external authentication server 122), such as the secureID solution produced by the company RSA Security; such a solution is then based on a token composed of the juxtaposition of a code displayed on a screen of a portable device that an operator managing the system responsible for the authentication previously supplied to said user and a personal code of the user that is known to said system responsible for the authentication, said portable device and said system responsible for the authentication being synchronised timewise so that said system responsible for the authentication knows at each instant which code is supposed to be displayed on the screen.

In a following optional step S302, the equipment 110 performs a filtering on the request received at step S301. The filtering serves to check that the format of the request received at step S301 is in accordance with the format expected by the equipment 110. In particular, the filtering serves to check that the request received at step S301 actually contains, in useful data, domain name information rather than a frame, e.g. of the TCP type (Transmission Control Protocol, as defined in the standard document RFC 793), encoded in binary. This enables the equipment 110 to rapidly reject malicious tunnelling attempts, e.g. DNS tunnelling, which would aim to use domain name resolution requests to enable frames, e.g. of the TCP or UDP (User Datagram Protocol, as defined in the standard document RFC 768) type, to leave a security domain in which said frames are supposed to remain confined. If the useful data of the request received at step S301 does not contain domain name information formatted as expected by the equipment 110, the equipment 110 rejects the request received at step S301.

In a particular embodiment, the equipment 110 effects another filtering according to a history of use, by the client device 100, of the services offered by the equipment 110. The equipment 110 can thus check whether the client device 100 has been marked as potentially malicious because it has repeatedly transmitted invalid requests to the equipment 110. If such is the case, the equipment 110 rejects the request received at step S301. The equipment 110 can also check whether the client device 110 has been marked as potentially malicious because it has transmitted requests to the equipment 110 at a frequency beyond a predefined threshold representing a behaviour merely having the purpose of saturating the communication bandwidth of the equipment 110 and/or unnecessarily consuming processing resources in the equipment 110, as is the case with attacks of the denial of service DoS or distributed denial of service DDoS type.

In a following optional step S303, the equipment 110 stores a trace of the request received at S301. This allows to construct or update the history of use mentioned above. The traces of the requests received are preferentially stored in the form of a tree of statistics based on a data structure including the IP addresses of the client device that respectively sent said requests, the frequency of reception of said requests, and the conformity of said requests with respect to the aforementioned filtering. Said data structure may also include the domain name information, if actually present, that said requests requested solving. Said data structure may also include information on the result of processing of said requests by the equipment 110, as detailed hereinafter, namely information indicating whether the domain name resolutions or the reverse resolutions requested could or could not be effected. Such a history of use does not constitute a data cache as such, but rather a metadata repository the size and duration of retention of which are dependent on a policy of management of the memory resources of the equipment 110. According to the modular architecture presented in relation to FIG. 1, the history of use is managed by the traceability unit 115, to which the client interface unit 111 resort to in order to examine and update said history of use.

When the equipment 110 updates the history of use following the reception of the request at step S301, the equipment 110 analyses the history of use, with regard to the client device 100 that sent the request at step S301, so as to determine whether said client device 100 must be considered to be potentially malicious according to its behaviour vis-à-vis the equipment 110. When the equipment 110 detects that the client device 100 must be considered to be potentially malicious, the equipment 110 updates the history of use so as to mark the client device 100 as potentially malicious. A classification can be applied according to said behaviour, e.g. "prohibited origin", "suspect client to serve in low priority", etc.

According to the modular architecture presented in relation to FIG. 1, when step S301 is performed, and optionally one or other or both of steps S302 and S303, the client interface unit 111 triggers the activation of authentication operations with the authentication unit 112 and awaits the result of the remainder of the processing of the request received at S301. In a particular embodiment, the client interface unit 111 also triggers early, with the domain name resolution unit 114, domain name resolution operations included in the request received at step S301.

In a following step S304, the equipment 110 performs operations of authentication of the client device 100 that sent the request received at step S301. The authentication operations correspond to a procedure which consists of checking the identity of the client device 100 or of the user of the client device 100 before optionally authorising said client device 100 to access resources. As already mentioned, the equipment 110 may, to do this, resort locally to a data repository of the CIDR type and/or to the external authentication server 122, with which the user of the client device 100 was previously registered. According to the modular architecture presented in relation to FIG. 1, step S304 is performed by the authentication unit 112.

When the equipment 110 uses locally a data repository of the CIDR type, said data repository includes at least the respective IP addresses of client devices that have previously been registered with the equipment 110. The equipment 110 then runs through said data repository seeking the IP address of the client device 100 that sent the request received at step S301. The equipment 110 is then able to determine whether the client device 100 that sent the request received at step S301 was previously registered with the equipment 110. In a particular embodiment, the equipment 110 extracts an identifier of the client device 100 (such as for example the domain name corresponding to the IP address of the client device 100, the MAC (medium access control) address of the client device 100 or of the user whose use of the client device 100 gave rise to the sending of the request received at step S301 (such as for example a user identifier userID or an IMSI (international mobile subscriber identity) identifier of a subscriber to a radiotelephony service via which the user accesses the services offered by the equipment 110), according to the prior registration made with the equipment 110. This identifier then serves as an entry point for the subsequent authorisation operations, more particularly in the case where the information relating to the identity of the user transmitted in the request received at step S301 would not allow it (which depends on the content of the data structure in which the information necessary for the authorisation operations are stored by the external authorisation server 123 or by the equipment 110).

When the equipment 110 resort to the external authentication server 122, the equipment 110 supplies, to the external authentication server 122, the IP address of the client device 100, as indicated in the request received at step S301. The external authentication server 122 then authenticates the client device 100 by checking whether the IP address of the client device 100 has previously been registered with the external authentication server 122. The external authentication server 122 then transmits to the equipment 110 information indicating the result of the authentication, and optionally an identifier of the client device 100 (such as for example the domain name corresponding to the IP address of the client device 100, or the MAC address of the client device 100) or of the user whose use of the client device 100 has given rise to the sending of the request received at step S301 (such as for example a user identifier userID or an IMSI identifier of a subscriber to a radiotelephony service via which the user accesses the services offered by the equipment 110), according to the prior registration made with the external authentication server 122. This identifier then serves as an entry point for the subsequent authorisation operations, more particularly in the case where the information relating to the identity of the user does not allow it (which depends on the content of the data structure in which the information necessary for the authorisation operations are stored by the external authorisation server 123 or by the equipment 110).

In a preferential embodiment, the equipment 110 checks first of all whether the information necessary for the authentication operations vis-à-vis the client device, or the user of said client device, is locally available in the CIDR data repository. If such is the case, the authentication operations are performed while relying locally on the CIDR data repository; otherwise the equipment 110 resort to the external authentication server 122, which allows to update said CIDR data repository vis-à-vis the authentication data of the client device, or of the user of said client device.

As already mentioned, the request received at step S301 may also include information relating to the identity of the user. This information may thus allow to reinforce the authentication operations. The authentication may thus be done on the basis of the IP address of the client device 100 and on the basis of the information relating to the identity of the user. When said information relating to the identity of the user is, according to the aforementioned first example, a user identifier and a password, the authentication consists of checking that said user identifier has previously been registered (in the CIDR data repository or with the external authentication server 122, depending on circumstances) in association with said password, also in association with the IP address of the client device 100. When said information relating to the identity of the user is, according to the aforementioned second example, a checksum supposed to be obtained by predefined application of a hash function on one or more items of identification information on the user known to the external authentication server 122, the authentication consists of checking that the application of the hash function to said items of user identification information (stored in association with the IP address of the client device 100) actually gives the same result as said checksum. When said information relating to the identity of the user is, according to the aforementioned third example, a token composed of the juxtaposition of a dynamic code and a personal code of the user, the authentication consists of checking that said dynamic code is in accordance with what is expected and that the personal code (which was stored in association with the IP address of the client device 100) does indeed correspond to that of said user according to the prior registration.

When the authentication fails, the equipment 110 rejects the request received from the client device 100. For reasons of simplification, this aspect is not shown in FIG. 3. According to the modular architecture presented in relation to FIG. 1, this rejection is done by the client interface unit 111 with the client device 100, after having been informed of the failure of the authentication by the authentication unit 112.

According to the modular architecture presented in relation to FIG. 1, when step S304 is performed the authentication unit 112 triggers the application of authorisation operations with the authorisation unit 113 and awaits the result of the remainder of the processing of the request received at step S301.

In a following step S305, the equipment 110 performs the authorisation operations vis-à-vis the client device 100 that sent the request received at step S301, or vis-à-vis the user whose use of the client device 100 gave rise to the sending of the request received at step S301, in order to check whether the client device 100 or said user is authorised to access the resources of the domain name included in the request received at step S301. As already mentioned, the equipment 110 may, to do this, resort locally to an ACL or CUL type data repository and/or to the external authorisation server 123 with which the client device 100 was previously registered. According to the modular architecture presented in relation to FIG. 1, step S305 is performed by the authorisation unit 113.

When the equipment 110 locally uses an ACL or CUL type data repository, said data repository includes at least the respective IP addresses of client devices and/or the respective identifiers of client devices or users that were previously registered with the equipment 110, in association with rights of access to the resources of domain names accessible via the equipment 110. The match between IP address and identifier may be provided by the aforementioned CIDR data repository, or by the external authentication server 122, at the end of the authentication operations of step S304. The match between IP address and identifier may also be provided by the content of the request received at step S301 (e.g. the request contains said IP address, a user name that can serve as such an identifier, and a password). The equipment 110 then runs through said data repository seeking said IP address or said identifier. The equipment 110 is then able to determine whether the client device 100, or the user, actually has right of access to the resources of the domain name specified in the request received at step S301.

When the equipment 110 resort to the external authorisation server 123, the equipment 110 supplies, to the external authorisation server 123, the IP address of the client device 100, as indicated in the request received at step S301, as well as the domain name specified in the request received at step S301. In a variant, the equipment 110 supplies, to the external authorisation server 123, the identifier of the client device 100 or of the user, as obtained at the end of the authentication operations, as well as the domain name specified in the request received at step S301. When the equipment 110 resort to the external authorisation server 123, the equipment 110 supplies, to the external authorisation server 123, the IP address of the client device 100, as indicated in the request received at step S301, as well as the domain name specified in the request received at step S301. In a variant, the equipment 110 supplies, to the external authorisation server 123, the identifier of the client device 100 or of the user, as obtained at the end of the authorisation operations, as well as the domain name specified in the request received at step S301. The external authorisation server 123 checks whether the client device 100 or the user actually has right of access to the resources of the domain name specified in the request received at step S301. The external authorisation server 123 then transmits to the equipment 110 information indicating the result of the authorisation, i.e. of the checking of the actual access rights vis-à-vis said resources.

In a preferential embodiment, the equipment 110 checks first of all whether the information necessary for the authorisation operations vis-à-vis the client device, or the user of said client device, is available in the CUL or ACL type data repository. If such is the case, the authorisation operations are performed while relying on the CUL or ACL type data repository; otherwise the equipment 110 resort to the external authorisation server 123, which allows to update said CUL or ACL type data repository vis-à-vis the domain names, the resources of which the client device, or the user of said client device, is (or is not) authorised to access. A significant advantage of the CUL type data repository compared with the ACL type data repository is that updating thereof is simplified thereby, and more particularly in the case where the external authorisation server 123 is able to return to the equipment 110 all the domain names the resources of which the client device, or the user of said client device, is (or is not) authorised to access, by virtue of the fact that the CUL type data repository allows to orient the searches (and therefore the updates) to the users or client devices, unlike the ACL type data repository, which allows to orient the searches (and therefore the updates) to the domain names. The external authorisation server 123 then also preferentially implements a CUL type data repository, or an equivalent data structure, for storing the information necessary for the authorisation operations, in order to enable the external authorisation server 123 to respond to the equipment 110 in a data format modelled on that of the data repository actually used locally by the equipment 110.

When authorisation fails, the equipment 110 rejects the request received from the client device 100. For reasons of simplification, this aspect is not shown in FIG. 3. According to the modular architecture presented in relation to FIG. 1, this rejection is made by the client interface unit 111 with the client device 100, after having been informed of the failure of the authorisation by the authentication unit 112, which itself was informed thereof by the authorisation unit 113.

According to the modular architecture presented in relation to FIG. 1, when step S305 is performed and the domain name resolution operations have been triggered early by the client interface unit 111 with the domain name resolution unit 114, the authorisation unit 113 confirms activation of said domain name resolution operations, and awaits the result of the remainder of the processing of the request received at step S301. When the domain name resolution operations had not been triggered early, the authorisation unit 113 triggers the activation of the domain name resolution operations with the domain name resolution unit 114, and awaits the result of the remainder of the processing of the request received at step S301.

It should be noted that, in the case where step S302 is not performed, any malicious request relating to tunnelling attempts, e.g. DNS tunnelling, are rejected during step S305, since, in the absence of domain name information in the request received at step S301, the authorisation operations cannot end favourably.

In a following step S306, when the equipment 110 has triggered the domain name resolution operations early, the equipment 110 terminates the operations of resolving the domain name stipulated in the request received at step S301. When the domain name resolution operations had not been triggered early, the equipment 110 performs the operations of resolving the domain name stipulated in the request received at step S301.

In the context of the domain name resolution operations, the equipment 110 checks whether there exists, in the cache 116, an association between the domain name stipulated in the request received at step S301 and the corresponding IP address. If such is the case, the equipment 110 is able to respond to the domain name resolution request sent by the client device 100. Otherwise the equipment 110 interrogates at least one external name server 124a, 124b. The interrogations with the external name servers 124a, 124b are preferentially carried out in parallel. The interrogations with the external name servers 124a, 124b are carried out independently of the security domains to which said external name servers 124a, 124b belong, the impermeability of the security domains being ensured at said external name servers 124a, 124b by means of said secure tunnels and at the client devices by means of the authorisation operations. This significantly simplifies the implementation of the equipment 110 and increases its ability to easily accept new security domains. If the external name servers 124a, 124b cannot effect the domain name resolution requested in the light of the data available to them, said external name servers 124a, 124b may have the domain name resolution request dealt with by one or more other name servers in accordance with the principle of recursivity known in DNS systems. As soon as a valid positive response is received from one of the external name servers 124a, 124b, the equipment 110 stores, in the cache 116, in a step S307, an association between said domain name and the corresponding IP address as specified in said valid positive response. The cache 116 is thus populated by means of results of domain name resolutions effected by the external name servers 124a, 124b to which the equipment 110 resort to, independently of said security domains, when said cache does not include data allowing to effect the required domain name resolution. The equipment 110 is then able to respond to the domain name resolution request sent by the client device 100. If the equipment 110 receives no valid positive response coming from one of the external name servers 124a, 124b within a predetermined period of time, the equipment 110 considers that the domain name resolution requested by the client device 110 has failed.

The early triggering of the domain name resolution operations, that is to say without awaiting the result of the authentication and authorisation operations, affords a significant saving in latency of processing of the domain name resolution requests by the equipment 110. Thus the association between domain name, as specified in the request received at step S301, and corresponding IP address can already be obtained at the moment when the authorisation operations end. If said association between said domain name and the corresponding IP address is not yet obtained, the equipment 110 awaits a valid positive response coming from one of the external name servers 124a, 124b until said aforementioned predefined period of time has expired. In the case where the authentication or authorisation operations fail, the fact that the domain name resolution operations were triggered early allows to populate the cache 116 (step S307) as required and thus to reduce the latency of a subsequent resolution request relating to the same domain name.

It should be noted that, in the case where step S302 is not performed, any malicious request relating to tunnelling attempts, e.g. DNS tunnelling, are rejected during the domain name resolution operations since, in the absence of any domain name information in the request received at step S301, the domain name resolution operations cannot end favourably and the request received at step S301 is not propagated to the external name servers 124a, 124b. Any malicious request relating to tunnelling attempts, e.g. DNS tunnelling, then remain confined in the equipment 110.

According to the modular architecture presented in relation to FIG. 1, when the result of the domain name resolution is obtained, said result is propagated by the domain name resolution unit 114 to the authorisation unit 113, which transmits it to the authentication unit 112, which itself transmits it to the client interface unit 111.

When the domain name resolution has failed, the equipment 110 rejects the request received from the client device 100. For reasons of simplification, this aspect is not shown in FIG. 3. According to the modular architecture presented in relation to FIG. 1, this rejection is effected by the client interface unit 111 with the client device 100.

In a following optional step S308, the equipment 110 stores information representing the result of the processing of the request received at step S301, in order to update the history of use already mentioned. This storage may be done by means of the external traceability server 125. According to the modular architecture presented in relation to FIG. 1, this storage is effected by the client interface unit 111 with the traceability unit 115.

In a following step S309, the equipment 110 transmits to the client device 110 a response to the request received at step S301, said response including the IP address corresponding to the domain name that had been stipulated in the request received at step S301. According to the modular architecture presented in relation to FIG. 1, said response is transmitted to the client device 100 by the client interface unit 111.

In a particular embodiment, to allow to implement the algorithm in FIG. 4 described below, following the authentication operations, the equipment 110 declares the client device 100 in the cache 116. To do this, the equipment 110 enters therein the IP address of the client device 100 (as indicated in the request received at step S301) in association with another representation of said IP address in a form that can be assimilated to a domain name, namely <invIP>.in-addr.arpa, where <invIP> is the IP address of the client device 100, the bytes of which are expressed in reverse order. As detailed hereinafter in relation to FIG. 4, this enables the equipment 100 to respond to reverse resolution requests concerning IP addresses of client devices considered to be active in the communication system since they made contact with the equipment 110 in order to effect a domain name resolution. For example, a security application detects a DoS activity at a server in one of the aforementioned security domains and wishes to identify the origin (beyond the IP address) of these attacks. According to another example, a server wishes to identify, for traceability reasons, the origin (beyond the IP address) of one or more requests that are addressed to it.

FIG. 4 illustrates schematically an algorithm used by the equipment 110 to effect an IP address identification, that is to say to effect a reverse resolution.

In a step S401, the equipment 110 receives an IP address identification request. Said request therefore includes, apart from the IP address of the client device 100 that sent said request, an IP address to be identified. Said request is preferentially in accordance with the DNS protocol (reverse DNS resolution), and the IP address to be identified is then in the form <invIP>.in-addr.arpa already mentioned. According to the modular architecture presented in relation to FIG. 1, step S401 is performed by the client interface unit 111.

Said request may further include information relating to the identity of a user whose use of the client device 100 gave rise to the sending of the request received at step S401. The various information variants relating to the identity of said user are identical to those already presented in relation to step S301.

In a following optional step S402, the equipment 110 carries out a filtering on the request received at step S401. The filtering serves to check that the format of the request received at step S401 is in accordance with the format expected by the equipment 110. In particular, the filtering serves to check that the request received at step S401 actually contains, in useful data, information on an IP address to be identified rather than a frame, e.g. of the TCP type, encoded in binary. This enables the equipment 110 to quickly reject malicious tunnelling attempts, as already presented in relation to step S302.

In a particular embodiment, the equipment 110 carries out another filtering according to the history of use, by the client device 100, of the services offered by the equipment 110, as already presented in relation to step S302.

In a following optional step S403, the equipment 110 stores a trace of the request received at step S401. This allows to construct or update said history of use, as already presented in relation to step S303.

When the equipment 110 updates the history of use following the reception of the request at step S401, the equipment 110 analyses the history of use, with regard to the client device 100 that sent the request at step S401, so as to determine whether said client device 100 must be considered to be potentially malicious according to its behaviour vis-à-vis the equipment 110. The equipment 110 reacts to this history of use in the same way as already presented in relation to step S303.

According to the modular architecture presented in relation to FIG. 1, when step S401 is performed, and optionally one or other or both of steps S402 and S403, the client interface unit 111 triggers the activation of authentication operations with the authentication unit 112 and awaits the result of the remainder of the processing of the request received at step S401. In a particular embodiment, the client interface unit 111 further also, with the domain name resolution unit 114, triggers reverse resolution operations early.

In a following step S404, the equipment 110 performs the operations of authentication of the client device 100 that sent the request received at step S401. These authentication operations correspond to a procedure that consists of checking the identity of the client device 100, or of the user, before optionally responding to the IP address identification request. These authentication operations take place as already presented in relation to step S304, including with regard to the processing of any information relating to the identity of the user included in the request received at step S401, as well as with regard to the updating of the CIDR data repository by means of the authentication data supplied by the external authentication server 122. According to the modular architecture presented in relation to FIG. 1, step S404 is performed by the authentication unit 112.

When the authentication fails, the equipment 110 rejects the request received from the client device 100. The equipment 110 therefore does not proceed with the identification of the IP address requested by the client device 100. For reasons of simplification, this aspect is not shown in FIG. 4. According to the modular architecture presented in relation to FIG. 1, this rejection is done by the client interface unit 111 with the client device 100, after having been informed of the failure of the authentication by the authentication unit 112.

In a particular embodiment, the equipment 110 obtains, following the authentication operations, an identifier of the client device 100, or of the user whose use of the client device 100 gave rise to the sending of the request received at step S401, as already described in relation to FIG. 3. This identifier then serves as an entry point for the subsequent authorisation operations, more particularly in the case where the information relating to the identity of the user transmitted in the request received at step S404 would not so permit (which depends on the content of the data structure in which the information necessary for the authorisation operations is stored by the external authorisation server 123 or by the equipment 110).

Thus, according to the modular architecture presented in relation to FIG. 1, when step S404 is performed, the authentication unit 112 triggers the activation of authorisation operations with the authorisation unit 113 and awaits the result of the remainder of the processing of the request received at step S401.

In a following step S405, the equipment 110 performs operations of authorisation of the client device 100, or of the user whose use of the client device 100 gave rise to the sending of a request received at step S401, in order to check whether the client device 100 or said user is authorised to access the resources relating to the IP address to be identified, i.e. the resources of the domain name associated with the IP address to be identified. As already mentioned, the equipment 110 may, to do this, resort locally to an ACL or CUL type data repository and/or to the external authorisation server 123. According to the modular architecture presented in relation to FIG. 1, step S405 is performed by the authorisation unit 113. As in the context of the algorithm in FIG. 3, the equipment 110 preferentially updates the ACL or CUL type data repository by means of the authorisation data received coming from the external authorisation server 123.

When the equipment 110 uses an ACL or CUL type data repository, said data repository includes at least the respective IP addresses of client devices and/or the respective identifiers of client devices or users which were previously registered with the equipment 110, in association with IP addresses for which said client devices or users are actually authorised to request a reverse resolution. The equipment 110 then runs through said data repository seeking the IP address of the client device 100, or the identifier of said client device 100 or of said user. The equipment 110 is then able to determine whether the client device 100 or said user is actually entitled to request the reverse resolution on the basis of the IP address stipulated in the request received at step S401.

When the equipment 110 resort to the external authorisation server 123, the equipment 110 supplies, to the external authorisation server 123, the IP address of the client device 100, or the identifier of said client device 100 or of said user, as well as the IP address to be identified. The external authorisation server 123 checks whether the client device 100, or said user, is actually entitled to request reverse resolution on the basis of the IP address stipulated in the request received at step S401. The external authentication server 122 then transmits to the equipment 110 information indicating the result of the authorisation, i.e. of the checking of the actual rights of access vis-à-vis said reverse resolution.

When the authorisation fails, the equipment 110 rejects the request received from the client device 100. For reasons of simplification, this aspect is not shown in FIG. 4. According to the modular architecture presented in relation to FIG. 1, this rejection is done by the client interface unit 110 with the client device 100, after having been informed of the failure of the authorisation by the authentication unit 112, which was itself informed thereof by the authorisation unit 113.

According to the modular architecture presented in relation to FIG. 1, when step S405 is performed and the reverse resolution operations had been triggered early by the client interface unit 111 with the domain name resolution unit 114, the authorisation unit 113 confirms the activation of said domain name resolution operations, and awaits the result of the remainder of the processing of the request received at step S401. When the reverse resolution operations had not been triggered early, the authorisation unit 113 triggers the activation of the reverse resolution operations with the domain name resolution unit 114 and awaits the result of the remainder of the processing of the request received at step S401.

In a following step S406, when the equipment 110 has triggered the reverse resolution operations early, the equipment 110 terminates the reverse resolution operations with regard to the request received at step S401. When the reverse resolution operations had not been triggered early, the equipment 110 performs the reverse resolution operations with regard to the request received at step S401.

In the context of the IP address identification operations, the equipment 110 checks whether there exists, in the cache 116, an association between the IP address to be identified and another representation of said IP address in a form that can be assimilated to a domain name, namely <invIP>.in-addr.arpa, where <invIP> is the IP address to be identified, the bytes of which are expressed in reverse order. If such is the case, this means that the IP address corresponds to a client device that previously requested the services of the equipment 110 and that the equipment 110 is able to respond to the IP address identification request sent by the client device 100. Otherwise the equipment 110 checks whether there exists, in the cache 116, an association between the IP address to be identified and a domain name that would result from a previous domain name resolution request that related to the domain name associated with the IP address to be identified. If such is the case, the equipment 110 is able to respond to the IP address identification request sent by the client device 100. Otherwise the equipment 110 interrogates at least one external name server 124a, 124b. The interrogations with the external name servers 124a, 124b are preferentially carried out in parallel. The interrogations with the external name servers 124a, 124b are carried out independently of the security domains to which said external name servers 124a, 124b belong, the impermeability of the security domains being ensured at said external name servers 124a, 124b by means of said secure tunnels and at the client devices by virtue of the authorisation operations. This significantly simplifies the implementation of the equipment 110 and increases its ability to easily accept new security domains. If the external name servers 124a, 124b cannot effect the reverse resolution requested in the light of the data available to them, said external name servers 124a, 124b can have the domain name resolution request dealt with at one or more other name servers in accordance with the principle of recursivity known in DNS systems. As soon as a valid positive response is received from one of the external name servers 124a, 124b, the equipment 110 stores, in the cache 116, in a step S407, an association between said domain name and the corresponding IP address as specified in said valid positive response. The equipment 110 is then able to respond to the reverse resolution request sent by the client device 100. If the equipment 110 does not receive any valid positive response coming from one of the external name servers 124a, 124b within a predefined period of time, the equipment 110 considers that the reverse resolution requested by the client device 110 has failed. This situation may arise if the reverse resolution relates to an IP address of a client device that has not previously requested the services of the equipment 110 and which is in a security domain outside the domains managed by the external name servers 124a, 124b.

Early triggering of the reverse resolution operations, that is to say without awaiting the result of the authentication and authorisation operations, affords a significant saving in latency of the processing of the reverse resolution requests by the equipment 110. Thus the result of the reverse resolution may already be obtained at the moment when the authorisation operations end. If the result of the reverse operation is not yet obtained, the equipment 110 awaits a valid positive response coming from one of the external name servers 124a, 124b until said aforementioned predefined period of time has expired. In the case where the authentication or authorisation operations fail, the fact that the reverse resolution operations were triggered early allows to populate the cache 116 as required (step S407) and thus to reduce the latency of a subsequent reverse resolution request relating to the said IP address.

According to the modular architecture presented in relation to FIG. 1, when the result of the reverse resolution is obtained, said result is propagated by the domain name resolution unit 114 to the authorisation unit 113, which transmits it to the authentication unit 112, which itself transmits it to the client interface unit 111.

When the IP address identification has failed, the equipment 110 rejects the request received from the client device 100. For reasons of simplification, this aspect is not shown in FIG. 4. According to the modular architecture presented in relation to FIG. 1, the result of the identification of the IP address that was supplied in the request received at step S401 is supplied by the client interface unit 111 to the client device 100 after having been informed thereof by the authentication unit 112.

In a following optional step S408, the equipment 110 stores information representing the result of the processing of the request received at step S401, in order to update the history of use already mentioned. This storage may be done by means of the external traceability server 125. According to the modular architecture presented in relation to FIG. 1, this storage is done by the client interface unit 111 with the traceability unit 115.

In a following step S409, the equipment 110 transmits to the client device 110 a response to said request received at step S401, said response including the domain name corresponding to the IP address that was to be identified, as stipulated in the request received at step S401. According to the modular architecture presented in relation to FIG. 1, said response is transmitted to the client device 100 by the client interface unit 111.

The architecture of the solution presented here is based on a concatenation of processing units one after the other, each unit activating the next in sequence in accordance with a domain name resolution algorithm presented in FIG. 3. A particular embodiment consists of maintaining a certain independence between the processing units and activating them from a controller that manages the sequencing thereof, this controller being able to be implemented at the client interface unit 111 or in a dedicated module.

Figure 5:
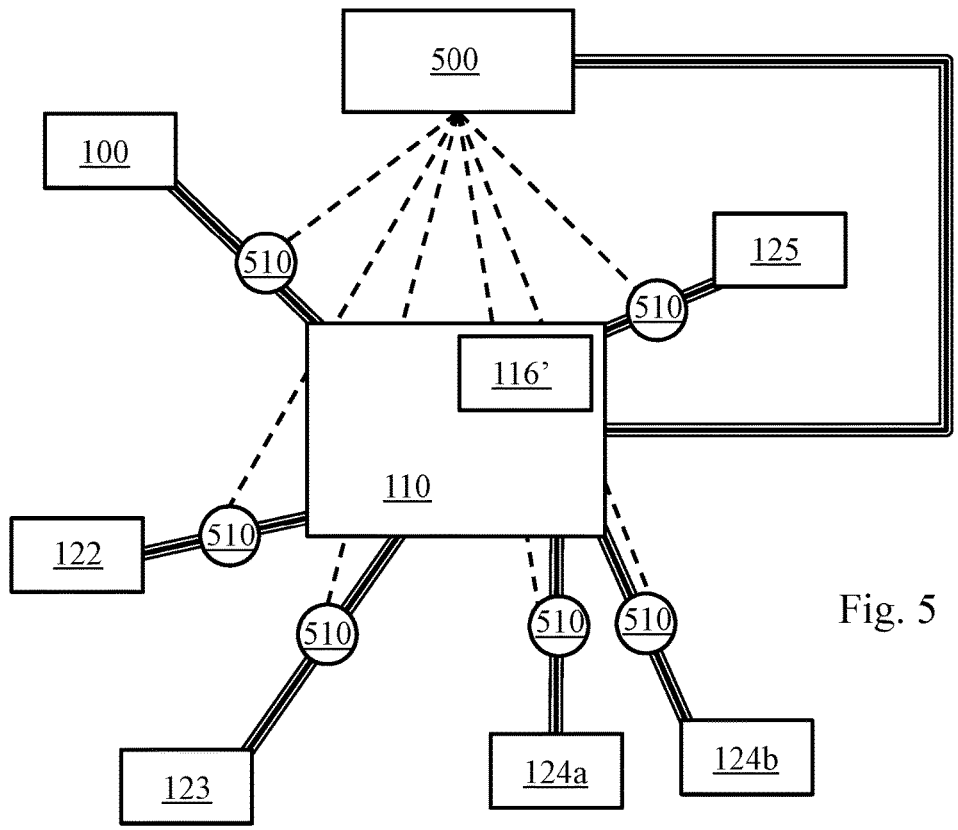
FIG. 5 illustrates schematically a particular embodiment of the communication system.

FIG. 5 illustrates schematically another communication system relating to at least one particular embodiment of the present invention. The diagram in FIG. 5 repeats the elements of the diagram in FIG. 1, to which there is added the SDN controller 500 (already mentioned in relation to FIG. 2) and showing a set of routers 510 for interconnecting the equipment 110 to the client devices and to the various servers 122, 123, 124, 125. In addition, FIG. 5 shows a complementary cache 116' used in the context of management of the allocation of virtual IP addresses as described below in relation to FIG. 7.

The equipment 110 is suitable for communicating with the SDN controller 500, preferentially via a secure tunnel. Exchanges between the equipment 110 and the SDN controller 500 are detailed below in relation to FIGS. 6 and 7, in particular embodiments of the invention.

The SDN controller 500 is an item of equipment, implemented on a machine or a plurality of machines cooperating together, providing control of the communication network via which the various elements shown in FIG. 5 communicate with each other. Architectures of the SDN type typically allow to decouple control of the communication network and the transportation of the data in the communication network. Control of the communication network then being centralised, thus affording a certain form of abstraction vis-à-vis the network infrastructure itself, it is easy to change the functionalities and automatic administration rules thereof, in particular by software update. This is because, in network infrastructures that are not of the SDN type, control of the communication network is distributed among the items of network equipment providing the transport of the data, then making the control functionalities and administration rules static overall and difficult to change. In the context of an SDN architecture, the SDN controller dynamically configures the network equipment, such as the routers 510, using for example the OpenFlow protocol of the ONF (Open Networking Foundation).

As described previously in relation to FIG. 3, the equipment 110 can detect the presence of a client device which, for example, seeks to use the services offered by the equipment 110 in order to attempt to effect malicious tunnelling, e.g. DNS tunnelling. The equipment 110 can then report the detection of such a malicious client device to the SDN controller 500, as described below in relation to FIG. 6, so as to apply a countermeasure aimed at isolating said client device from the equipment 110 and thus improving the performance, integrity and security of the communication network.

The SDN controller 500 can thus allow, by means of an ability to dynamically allocate virtual IP addresses in the communication network, to mask the true IP address relating to the domain name supplied to a client device in response to a domain name resolution request, and thus to improve the security of the communication network. This aspect is detailed below in relation to FIG. 7.

Figure 6:
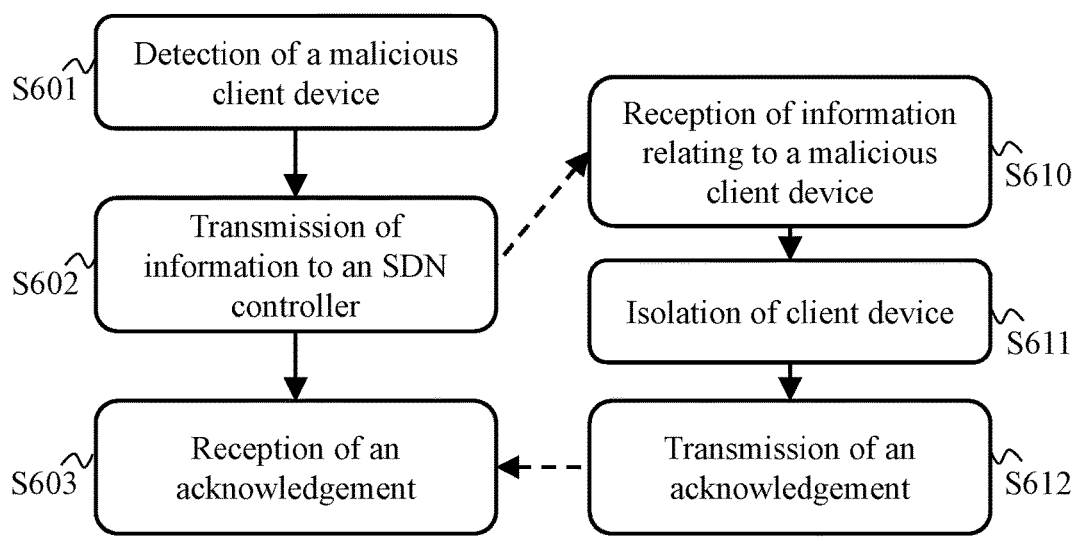
FIG. 6 illustrates schematically a set of algorithms, implemented in the context of the system in FIG. 5, for reacting to a detection of the presence of a malicious client device.

FIG. 6 thus illustrates schematically a set of algorithms, implemented in the context of the system in FIG. 5, for reacting to a detection of the presence of a malicious client device.

In a step S601, the equipment 110 detects the presence of a malicious client device, as previously described in relation to FIG. 3.

In a step S602, the equipment 110 transmits to the SDN controller 500 information indicating that the presence of a malicious client device has been detected, said information including the IP address of said malicious client device.

This information, transmitted by the equipment 110 at step S602, is received by the SDN controller 500 in a step S610.

Next, the SDN controller 500 performs a step S611, in which the SDN controller 500 configures at least one item of equipment of the communication network so as to isolate said malicious client device from the equipment 110.

In a first embodiment, the SDN controller 500 informs the control plan of the communication network so that the routers 510 are configured to prevent any traffic coming from the IP address of the malicious client device as supplied by the equipment 110. The routers 510 then have an instruction to drop any packet having the IP address of the malicious client device as the source IP address. An alternative consists of the SDN controller 500 sending an instruction to one or more items of network equipment, such as routers or switches, directly connected to the malicious client device, to close each Ethernet port to which said malicious client device is directly connected (it is conceivable that the malicious client device may have a plurality of Ethernet interfaces and that said malicious client device may then be connected to a plurality of Ethernet interfaces of said network equipment or to a plurality of items of network equipment)

In a second embodiment, when the malicious client device does not belong to the communication network (or a part of the communication network) for which the SDN controller 500 is responsible, the SDN controller 500 warns another SDN controller responsible for the communication network (or the part of the communication network) where the malicious client device is situated, so that this other SDN controller can optionally take suitable steps for isolating said malicious client device. The SDN controllers then have interconnection rules defining which SDN controller is responsible for which communication network (or part of a communication network).

In a third embodiment, the equipment 110 supplies a fictitious IP address to the malicious client device, in response to a domain name resolution request sent by said malicious client device, so as to redirect all or some of the communications from said client device vis-à-vis said domain name to this fictitious IP address. The fictitious IP address supplied by the equipment 110 may have been previously configured in the equipment 110 or be obtained from a complementary device of the communication network. This approach allows to observe the means for compromising a client device suspected of being malicious and to allow more time for acting against said malicious client device, without exposing the sensitive network resources to which the malicious client device wishes to have access. This third embodiment may be implemented by the equipment 110 without resorting to the SDN controller 500 (simply relying on the diagram in FIG. 1). The presence of the SDN controller 500 does however, when sufficient data have been collected to confirm that the behaviour of said client device is malicious, to implement the first aforementioned embodiment, to prevent any traffic coming from the IP address of the malicious client device.

In a following step S612, the SDN controller 500 sends an acknowledgement to the equipment 110 in order to inform the equipment 110 that the information indicating that the presence of the malicious device has been detected has been processed.

This acknowledgement transmitted by the SDN controller 500 at step S612 is received by the equipment 110 in a step S603.

According to the modular architecture presented in relation to FIG. 1, steps S601, S602 and S603 are performed by the client interface unit 111.

Figure 7:
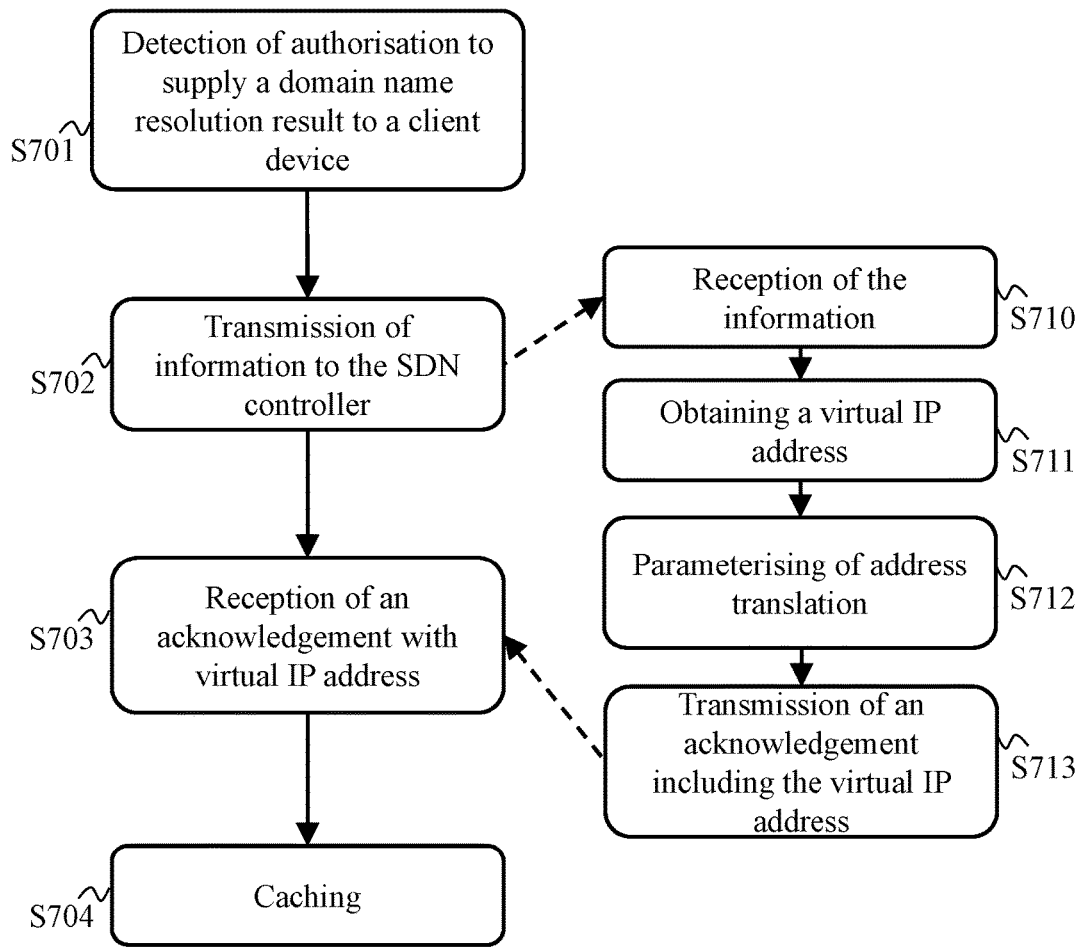
FIG. 7 illustrates schematically a set of algorithms, implemented in the context of the system in FIG. 5, for allocating virtual IP addresses.

FIG. 7 illustrates schematically a set of algorithms, implemented in the context of the system of FIG. 5, for allocating virtual IP addresses.

In a step S701, the equipment 110 detects that, following the authentication and authorisation operations performed in the context of the algorithm of FIG. 3, a client device 100 is authenticated and authorised to receive the result of a domain name resolution for which said client device 100 has transmitted a request to the equipment 110.

In a following step S702, the equipment 110 transmits to the SDN controller 500 information indicating that said client device 100 has obtained authorisation to receive the result of the domain name resolution requested by said client device and consequently that a virtual IP address is requested in replacement for the IP address that actually corresponds to said domain name. Said information includes at least the IP address corresponding to the domain name that was the subject of the resolution. Said information may also comprise the IP address of the client device in question and/or the domain name concerned.

This information, transmitted by the equipment 110 at step S702, is received by the SDN controller 500 in a step S710.

Next the SDN controller 500 performs a step S711 in which the SDN controller 500 obtains a virtual IP address, that is to say an IP address that is unused in the addressing plan of the communication network managed by the SDN controller 500. This virtual IP address is thus intended to be allocated to the domain name that was the subject of the resolution, from the point of view of the client device 100 in question. The SDN controller 500 keeps a trace of the association between the IP address corresponding to the domain name in question and the virtual IP address. The SDN controller 500 can also keep a trace in correspondence of the IP address of the client device 100 in question. It should therefore be noted that, if a plurality of clients make domain name resolution requests for the same domain name, a different virtual IP address is supplied to each of them, which allows, as detailed below, to subsequently refuse access to the resources of said domain name to a client device that proves to be malicious without preventing the other client devices from continuing to access the resources of said domain name. It is, in a variant, possible to allocate the same virtual IP address to a domain name whatever the client device originating the domain name resolution request. However, implementing this approach is more complex for subsequently refusing access to the resources of said domain name to a client device that proves to be malicious, since it would be necessary to invalidate the virtual IP address and to allocate a new virtual IP address to said domain name, and to inform the other client devices of this new virtual IP address in order to enable them to continue to access the resources of said domain name.

In a following step S712, the SDN controller 500 carries out an address-translation parameterising with boundary routers of the communication network managed by the SDN controller 500, so that said virtual IP address is associated with said IP address that actually corresponds to said domain name. The SDN controller 500 has an overall view of the communication network and of its topology, for example by means of a link-state routing protocol such as OSPF (open shortest path first), which enables it to identify which are said boundary routers of said communication network. Thus the virtual IP address allows to mask at the client device 100 that made the domain name resolution request the real IP address of the domain name requested and thus to improve security vis-à-vis the resources of the domain name to which the client device 100 wishes to have access following the domain name resolution that said client device 100 requested.

In a following step S713, the SDN controller 500 sends an acknowledgement to the equipment 110 in order to inform the equipment 110 which virtual IP address has been allocated at step S711 in order to mask the domain name vis-à-vis the client device 100 in question. This acknowledgement, transmitted by the SDN controller 500 at step S713, is received by the equipment 110 in a step S703.

In a following step S704, the equipment 110 extracts the virtual IP address contained in the acknowledgement and stores, in the complementary cache 116', said virtual IP address in association with the real IP address associated with said domain name, in correspondence with the IP address of the client device 100 that sent the domain name resolution request that gave rise to the allocation of said virtual IP address. The equipment 110 then returns to the client device 100 that sent the request received at step S301 said virtual IP address in place of the IP address that actually corresponds to said domain name. Storing in the complementary cache 116' data relating to the virtual IP address enables the equipment 110 to respond to future reverse resolution requests vis-à-vis the virtual IP address allocated to said domain name for the client device 100 in question, acting on the complementary cache 116' in order to obtain the real IP address corresponding to the virtual IP address, while checking that it is this virtual IP address that had been communicated to the client device 100 that sent the reverse resolution request, and then acting on the cache 116 in order to find the domain name corresponding to the real IP address supplied by the complementary cache 116'. This avoids having to act on the SDN controller 500 in the case of reverse resolution vis-à-vis said virtual IP address.

In a variant embodiment of step S704, the equipment 110 also stores, in the complementary cache 116', the domain name concerned in correspondence with said virtual IP address. This storage in the complementary cache 116' enables the equipment 110 to respond to future reverse resolution requests vis-à-vis said virtual IP address without having to resort to the cache 116, all the information necessary for the reverse resolution then being included in the complementary cache 116', which affords better reactivity of the equipment 110 for performing the reverse resolution.

It should be noted that the equipment 110 can interrogate the cache 116 firstly by relying on the virtual IP address and, as the cache 116 does not have any data corresponding to the IP address in question (which is virtual), the equipment 110 can then turn to the complementary cache 116' in order to identify whether this IP address is actually a virtual IP address that was communicated to said client device, and thus to continue the reverse resolution operations. This approach is simpler to integrate in the reverse resolution operations of the algorithm of FIG. 4.

According to the modular architecture presented in relation to FIG. 1, steps S701, S702, S703 and S704 are performed by the domain name resolution unit 114.

In a particular embodiment, in step S702, said information transmitted by the equipment 110 to the SDN controller 500 also includes a time period beyond which said virtual IP address is considered to be obsolete. According to this embodiment, in step S703, the SDN controller starts a time delay of duration equal to the time period supplied by the equipment 110 in step S702, simultaneously with the IP address translation parameterising of step S712. At the expiry of this time delay, the SDN controller 500 performs operations, with the boundary routers of the communication network, of cancelling the address translation parameterising effected at step S712. The SDN controller 500 can send information to the equipment 110 indicating the expiry of this time delay and the cancelling of the address transmission parameterising. This information includes at least the virtual IP address in question, and optionally the IP address actually corresponding to the domain name concerned, and also optionally the IP address of the client device 100 that sent the domain resolution request. On receipt of this information, the equipment 110 deletes from the complementary cache 116' the data relating to said virtual IP address (including therefore the data that are associated therewith). In a variant, the equipment 110 can for its part, in parallel with the SDN controller 500, manage the same time delay, in order to delete from the complementary cache 116' the data relating to said virtual IP address, without the SDN controller 500 having to ask it. Thus, beyond this time delay, the client device 100 must renew its domain name resolution request in order to continue to access the resources of the domain name in question. Its access to the resources of the domain name in question may thus easily be called into question, by preventing access to said resources for said client device 100 during the authorisation operations detailed in relation to FIG. 3. This also allows to easily manage the memory resources necessary for implementing the complementary cache 116'.

Rather than awaiting expiry of the time delay when the client device concerned is detected as being malicious, it is possible to prevent continuing to access the resources of the domain name concerned. This is because, by relying on the principle of exchanges and processing operations already mentioned in relation to FIG. 6, the equipment 110 informs the SDN controller 500 of this, which, in a step S611, isolates the client device 100 in question by cancelling the address translation parameterising done at step S712 for the client device 100 in question vis-à-vis the domain name concerned.

The invention claimed is:

1. An equipment suitable for offering domain name resolution services, said equipment being intended to be connected to a communication network implementing security domains, said equipment being intended to be declared as a domain name server with client devices in said communication network, said equipment including:
  a client interface unit suitable for receiving domain name resolution requests coming from said client devices and for responding to said requests, each domain name resolution request including an IP address of the client device that sent said request and a domain name to be resolved;
  an authentication unit suitable for performing first authentication operations checking, for each domain name resolution request, at least by means of the IP address of the client device that sent said request, whether said client device or a user of said client device has previously been registered with said equipment or an external authentication server to which said equipment is connected;
  an authorisation unit suitable for performing first authorisation operations checking, for each request for resolution of a domain name authenticated by the authentication unit, whether the client device that sent said request or the user of said client device actually has a right of access to the resources of said domain name; and
  a domain name resolution unit suitable for performing domain name resolution operations by means of a cache in which said equipment stores associations of IP addresses and respective domain names,
said cache being populated by means of results of domain name resolutions made by external name servers each corresponding to one of said security domains to which said equipment is intended to be connected via respective secure tunnels and to which said equipment resort to, independently of said security domains, when said cache does not include data allowing to effect the required domain name resolution.

2. The equipment according to claim 1, wherein the client interface unit triggers the domain name resolution operations in parallel with said first authentication and authorisation operations.

3. The equipment according to claim 1, wherein the client interface unit effects a filtering of the domain name resolution requests received by checking that each request actually contains, in useful data, domain name information formatted as expected by said equipment.

4. The equipment according to claim 1, wherein the client interface unit effects another filtering on the basis of a history of use of the services of said equipment by the client devices that respectively sent said domain name resolution requests.

5. The equipment according to claim 1, wherein the authentication unit is also suitable for obtaining, in each request processed by said authentication unit, information on identification of a user where the use of the client device that sent said request has given rise to the sending of said request, and in that said first authentication operations also check that said identification information corresponds to a user previously registered with said equipment or with the external authentication server in association with the IP address of said client device.

6. The equipment according to claim 1, wherein the authorisation unit has locally a data repository in which the authorisation unit, for each request for resolution of a domain name authenticated by the authentication unit, checks whether the client device that sent said request or the user of said client device actually has right of access to the resources of said domain name, said data repository being populated by means of the results of authorisations made by an external authorisation server to which said equipment is connected and to which said equipment resort to when said data repository does not include data allowing to make the required authorisation.

7. The equipment according to claim 6, wherein said data repository defines, for each user or client device previously recorded, which are the domain names the resources of which are accessible to said user or to said client device.

8. The equipment according to claim 1, wherein the authentication unit locally has a data repository containing authentication data of client devices previously recorded and in which the authentication unit, for each request for resolution of a domain name, checks whether the client device that sent said request or a user whose use of said client device has given rise to the sending of said request has actually been previously registered, said data repository being populated by means of results of authentications made by the external authentication server and to which said equipment resort to when said data repository does not include data allowing to make the required authentication.

9. The equipment according to claim 1, wherein the domain name resolution unit is, when the domain name resolution unit uses the external name servers, suitable for requesting in parallel the domain name resolution of said external name services, and in that the first valid positive response received is used to populate said cache.

10. The equipment according to claim 1, wherein said equipment is, following said first authentication operations, suitable for declaring the client device that sent the domain name resolution requests in said cache by entering therein the IP address of said client device in association with another representation of said IP address in a form that can be assimilated to a domain name, and in that the equipment is further suitable for offering reverse resolution services, and:

the client interface unit is suitable for receiving reverse resolution requests coming from said client devices and for responding to said requests, each reverse resolution request including an IP address of the client device that sent said request and an IP address to be identified;

the authentication unit is suitable for performing second authentication operations checking, for each reverse resolution request, at least by means of the IP address of the client device that sent said request, whether said client device or a user of said client device has previously been registered with said equipment or said external authentication server;

the authorisation unit is suitable for performing second authorisation operations checking, for each reverse resolution request authenticated by the authentication unit, whether the client device that sent said request or the user of said client device actually has right of access to the resources to which said reverse resolution relates; and the domain name resolution unit is suitable for performing reverse resolution operations by means of the cache, by checking whether the IP address to be identified is contained in said cache and resorting to the external name servers, independently of said security domains, when said cache does not include data allowing to effect the required reverse resolution.

11. The equipment according to claim 10, wherein the client interface unit triggers the reverse resolution operations in parallel with said second authentication and authorisation operations.

12. The equipment according to claim 10, wherein the domain name resolution unit is, when the domain name resolution unit resort to the external name servers, suitable for requesting in parallel the reverse resolution of said external name servers, and in that the first valid positive response received is used to populate said cache.

13. The equipment according to claim 1, wherein said equipment is, when said equipment detects the presence of a malicious client device, suitable for providing a fictitious IP address to the malicious client device, in response to a domain name resolution request sent by said malicious client device.

14. The equipment according to claim 1, wherein said equipment is, when said equipment detects the presence of a malicious client device, suitable for transmitting to an SDN controller information indicating that the presence of a malicious client device has been detected, said information including the IP address of said malicious client device, so that the SDN controller isolates said malicious client device.

15. The equipment according to claim 1, wherein said equipment is, when a client device is authenticated and authorised to receive the result of a domain name resolution following the authentication and authorisation operations, suitable for transmitting to an SDN controller information indicating that said client device has obtained authorisation to receive the result of the domain name resolution and that a virtual IP address is required in replacement for the IP address that actually corresponds to said domain name, so that the SDN controller allocates said virtual IP address and effects an address translation parameterising with boundary routers of the communication network managed by the SDN controller so that said virtual IP address is associated with the IP address that actually corresponds to said domain name, and in that said equipment is suitable for supplying said virtual IP address to said client device in place of the IP address that actually corresponds to said domain name.

16. The equipment according to claim 15, wherein said equipment is suitable for supplying distinct virtual IP addresses to distinct client devices for the same domain name.

17. The equipment according to claim 15, wherein said equipment comprises a supplementary cache, and in that said equipment is suitable for storing said virtual IP address in the supplementary cache in association with the real IP address associated with said domain name, in correspondence with the IP address of the client device that sent the domain name resolution request that gave rise to the allocation of said virtual IP address, in order to respond to a future reverse resolution request vis-à-vis said virtual IP address by acting on the supplementary cache in order to obtain the real IP address corresponding to said virtual IP address, while checking that it is this virtual IP address that had been communicated to the client device that sent said future reverse resolution request.

18. The equipment according to claim 17, wherein said information transmitted by said equipment to the SDN controller also includes a time period, so that the SDN controller performs operations, with boundary routers of the communication network, of cancelling the address translation parameterising when said time period has expired, and in that said equipment is suitable for deleting from the supplementary cache the data relating to said virtual IP address when said time period has expired.

19. A method implemented by equipment for offering domain name resolution services, said equipment being connected to a communication network implementing security domains, said equipment being declared to be a domain name server with client devices in said communication network, said equipment receiving domain name resolution requests coming from said client devices and responding to said requests, each domain name resolution request including an IP address of the client device that sent said request and a domain name to be resolved;

wherein said equipment also performs:

performing authentication operations checking, for each domain name resolution request, at least by means of the IP address of the client device that sent said request, whether said client device or a user of said client device has previously been registered with said equipment or an external authentication server to which said equipment is connected;

performing authorisation operations checking, for each request for resolution of a domain name authenticated by the authentication unit, whether the client device that sent said request or the user of said client device actually has a right of access to the resources of said domain name;

performing domain name resolution operations by means of a cache in which said equipment stores associations of IP addresses and respective domain names, said cache being populated by virtue of results of domain name resolutions performed by external name servers each corresponding to one of said security domains to which said equipment is connected via respective secure tunnels and to which said equipment resort, independently of said security domains, when said cache does not include data allowing to effect the required domain name resolution.

20. Non transitory information storage medium, storing a computer program comprising instructions which can be loaded by a processor to cause said programmable device to implement the method according to claim 19, when said program is executed by a processor.

\* \* \* \* \*